United States Patent [19]

Rutt

[11] 4,137,993

[45] Feb. 6, 1979

[54] INSULATED EXHAUST SYSTEM COMPONENT

[75] Inventor: Paul A. Rutt, Jackson, Mich.

[73] Assignee: Tenneco, Inc., Racine, Wis.

[21] Appl. No.: 835,054

[22] Filed: Sep. 21, 1977

[51] Int. Cl.² .............................................. F01N 7/16
[52] U.S. Cl. .................................. 181/282; 181/294; 428/268
[58] Field of Search .............. 181/282, 284, 294, 296, 181/256; 428/268

[56] References Cited

U.S. PATENT DOCUMENTS

| 3,008,257 | 11/1961 | Landgraf | 181/296 |
| 3,328,086 | 6/1967 | Johnston | 181/294 |
| 3,710,891 | 1/1973 | Flugger | 181/256 |
| 3,903,987 | 9/1975 | Brown et al. | 181/282 |
| 4,026,381 | 5/1977 | Conley | 181/256 |

Primary Examiner—Stephen J. Tomsky
Attorney, Agent, or Firm—Harness, Dickey & Pierce

[57] ABSTRACT

A fiberglass mat of a particular formulation is used to insulate exhaust system components such as mufflers, converters, and conduits.

6 Claims, 4 Drawing Figures

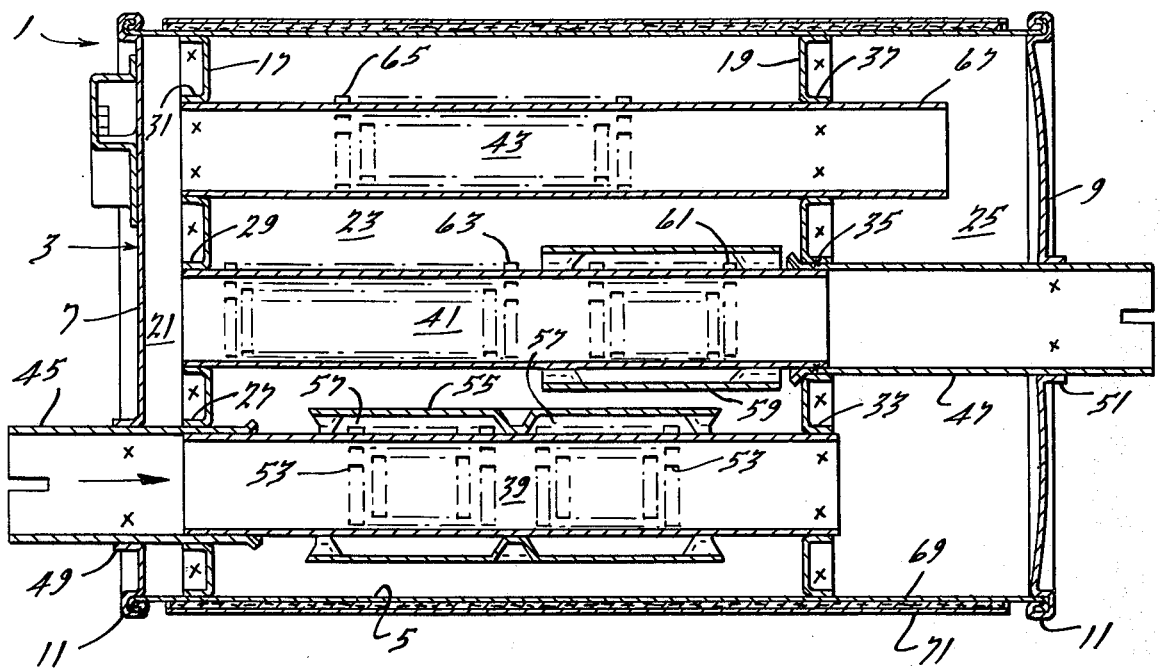

INSULATED EXHAUST SYSTEM COMPONENT

BACKGROUND OF THE INVENTION

In the past and currently, large quantities of insulating paper containing asbestos are wrapped around internal combustion engine exhaust system components, principally mufflers, to provide thermal and acoustic insulation. However, various authorities now believe that the dust created in the handling of asbestos materials may be hazardous. It is very difficult in the mass manufacture of exhaust system components for use in automobiles, trucks, etc., to completely eliminate the possibility that in cutting or handling asbestos paper some of it will be released into the air. Likewise, if failure of exhaust system components occurs after usage, asbestos may be released into the air.

BRIEF SUMMARY OF THE INVENTION

In view of the objection to the use of asbestos on the ground that it is potentially hazardous to health, it is the purpose of this invention to provide an exhaust system component for internal combustion engines which is insulated by means of a material that does not contain asbestos. The invention accomplishes this purpose by the use of a special mat consisting essentially of a specific type of glass fibers properly sized and bound together.

DESCRIPTION OF THE DRAWINGS

FIG. 1 is a longitudinal cross section (with parts rotated into the plane of the drawing to facilitate illustration) through a typical exhaust system component in the form of an automotive muffler which embodies the invention;

FIG. 2 is an end elevation taken from the right of FIG. 1;

FIG. 3 is an enlarged cross section taken along the line 3—3 of FIG. 2; and

FIG. 4 is a typical cross section through a small piece of mat used in practicing the invention.

DESCRIPTION OF THE INVENTION

A typical automotive muffler 1 embodying the invention is illustrated in the drawings and is intended to illustrate an exhaust system component, which may also be a converter, conduit, etc. The muffler 1 has a housing 3 which includes an oval shaped tubular shell 5 which is closed at its upstream end by an inlet header 7 and at its downstream end by an outlet header 9, the periphery of each header being interlocked in a typical roll seam joint 11 with an adjacent end of the shell 5. The shell 5 is formed from an initially rectangular piece of sheet steel that is shaped into tubular form and its longitudinal side edges 13 are interlocked in a longitudinal lock seam 15 projecting inwardly with respect to the outer surface of the shell 5 as seen in FIG. 2.

The inside of the shell 5 contains a pair of longitudinally spaced transverse partitions 17 and 19 which have circumferential flanges that are spot welded to the shell 5 as indicated by the designation "X" in the drawings. These partitions subdivide the space inside of the shell 5 into the three chambers 21, 23, and 25. The partition 17 has three annular necks 27, 29, and 31 which are aligned respectively with three necks 33, 35, and 37 that are formed in the partition 19. An inlet tube 39 is supported inside of the aligned necks 27 and 33, being spot welded to neck 33 as indicated by the designation "X;" an outlet tube 41 is supported in the aligned necks 29 and 35; and an intermediate, return flow tube 43 is supported in the necks 31 and 37. An inlet bushing 45 and an outlet bushing 47 are supported in and spot welded to annular necks 49 and 51 formed respectively in the inlet and outlet headers 7 and 9. The inlet bushing 45 extends through and is supported in the neck 27, and supports the upstream end of the inlet gas flow tube 39. The inner end of the outlet bushing 47 extends through and is supported in the neck 35 of header 19 that is an alignment with the neck 51 and serves to receive and support the downstream end of the outlet gas flow tube 41.

The inlet tube 39 has a pair of louver patches 53 that are surrounded by a closed tubular shell 55 that is shaped to provide closed chambers 57 into which the louvers of the patches 53 open to provide acoustic communication between the tube 39 and the chambers 57.

Similarly, the outlet tube 41 has a closed shell 59 mounted on it to provide a closed chamber into which the louvers of a louver patch 61 open to provide a spit chamber attenuation system for the outlet tube. In addition, the outlet tube 41 has a louver patch 63 opening into the chamber 23 and the return flow tube 43 has a louver patch 65 also opening into the chamber 23.

In operation as a muffler to attenuate sound in an internal combustion engine exhaust system, gas enters the muffler 1 through the inlet bushing 45 and flows down the inlet tube 39 into the crossover chamber 25. High frequency noises and roughness are attenuated by the dual spit chamber arrangement 55 and lower frequencies by flow of gas into and through the relatively large chamber 25. The gas in the chamber 25 enters the end 67, which projects into the chamber, of the return flow tube 43 and goes in a reverse direction toward the upstream end of the muffler to enter the crossover chamber 21. The acoustic connection provided by the louver patch 65 with the chamber 23 attenuates intermediate and high frequency sound and the abrupt changes in diameter as the gas flows from chamber 25 into chamber 21 produce significant sound attenuation. The gas in the chamber 21 enters the outlet tube 41 and in flowing by the louver patch 63 has communication with the chamber 23 so that sound attenuation can occur as well as come bypass flow from the louver patch 65. As the gas passes the spit chamber 59, higher frequencies and roughness are attenuated and thereafter the gas enters the outlet bushing 47 to flow downstream in the exhaust system.

The parts so far described are made of metal, usually sheet steel, and therefore have a relatively high thermal conductivity. An insulating layer 69 held in place by an outer layer of metal 71 is wrapped around the exterior of the shell 5 and held in place by the longitudinal side edges of the metal 71 which are interlocked together as seen at 73. Prior to wrapping, the insulating layer 69 is preferably a rectangular piece of material and after wrapping it functions to reduce the heat loss to the surrounding environment, lower the external temperature of the muffler, and also to dampen vibrations of the shell 5, i.e. attenuates shell noise.

As mentioned above, it has been the practice to use an asbestos-based paper for the layer 69. In accordance with the present invention, a material that contains no asbestos is used as a replacement for asbestos-based paper. The material used is similar to asbestos paper in that it is available in sheet or roll form and has a similar stiffness and mechanical strength, but it is substantially more resilient; and it is at least substantially equivalent to asbestos paper with respect to thermal insulation, noise damping, and durability.

The material used in practicing the invention is a wet-laid glass fiber mat in sheet or roll form of substantially uniform nominal thickness and of substantially homogeneous composition. It has a basis weight (i.e. pounds/3000 sq. ft.) in the range of 65-150 pounds, is composed of borosilicate glass fibers of grades D-E (i.e. 5.08-7.62 microns fiber diameter) having a preferable glass fiber length of about ¼" to ½", and an average caliper (thickness) per ASTM test D645 of 0.020 to 0.100 inches. About 80% of the fibers should be at least ¼" in length and preferably the 80% of the fibers which are at least ¼" in length would be between ¼" and about ½" in length. The glass fibers are physically intermingled in a random orientation in the process of making the mat to provide a relatively high degree of mat integrity and resistance to disintegration. The mat generally contains no filler and the only other ingredient besides glass fibers is a binder that is dispersed so as to eliminate loose fibers on either surface of the material. The binder is preferably a polyvinyl alcohol resin in the amount of about 2-5% by weight of the mat. Thus, glass fibers constitute about 95-98% of the weight of the mat in the ready to use condition. The mat has a tensile strength per ASTM test D828 in the machine direction of about 3.5-5.0 pounds/inch of width and in the cross machine direction of about 2.5-4.0 pounds/inch of width. The required tensile strength is a function of both basis weight and caliper, e.g. with a nominal basis weight of 65 pounds and caliper of 0.050 inch the tensile strength in the machine direction is 3.5 pounds per inch of width and the cross machine direction is 2.5 pounds per inch of width while with a nominal basis weight of 130 pounds and caliper of 0.100 inch the tensile strength in the machine direction would be about 5.0 pounds per inch of width and the cross machine direction would be about 4.0 pounds per inch of width. Materials meeting these various specifications are commercially available.

Referring to FIG. 4, generally these mats, such as mat 79, are produced on a modified Four drinier machine and have a wire side 80 and a side 81 opposite the wire side. Wire side 80 is typically, as shown, flat or planar. Side 81 is produced with a very irregular or random undulating or stucco like appearing surface having high portions 82 and low portions 83.

In a typical mat the low portions 83 and the high portions 82 of the mat may deviate from the nominal thickness of the mat by 20-30% of the nominal thickness of the mat. For example, if the mat 79 shown in FIG. 4 has a caliper of 0.040 inch, the distance between wire side 80 and low portions 83 will bypically be in the order of 0.030 inch and the distance between the wire side 80 and the high portions 82 would typically be about 0.050 inch.

In assembly, the flat surface 80 is preferably placed in contact with the cover 71 when the latter is flat and then the combination is wrapped around the shell 5 and the cover lockseamed as at 73. Having the flat surface 80 in contact with the cover metal increases the friction between the two and facilitates assembly. On the other hand, the undulated surface 81 is in contact with the shell 5, which is the source of heat and sound, and while there is less surface contact area with the mat, there is a greatly increased absorbent surface area due to the undulations. Due to the much greater resiliency of the fiberglass mat than that of asbestos, the cover 71 can be wrapped tighter (i.e. the layer 69 compressed to a substantially greater extent) which translates into a cover 71 that has a somewhat less wrap-around length than for an asbestos layer and therefore uses less metal and is of reduced weight.

The space present between adjacent high portions 82 is occupied by air which is of thermal and accoustic insulative value when such mats are placed in an exhaust system component. Additonally, the undulating contour of side 81 increases the volume occupied by mat 79, for a given amount of material. This increase in volume increases the economic and the resource efficiency of such mats as less material is required for a given application and less weight is added to the exhaust system component. Weight reduction of vehicle components is very important at the present time to increase the energy efficiency of motor vehicles.

Investigation to date indicates that one or two layers of 0.030" embossed asbestos paper (0.018 paper embossed to 0.030 overall thickness) may be satisfactorily replaced as a muffler or resonator wrap 69 by one layer of the present material which is of a nominal 65 pound (range 60-70) basis weight and nominal 0.050 inch (range 0.045-0.055) caliper with a weight reduction, respectively, calculated to be about 76% and 88% of the weight of the asbestos; and that three such layers of asbestos may be satisfactorily replaced by two layers of the just mentioned basis weight and caliper or by one layer of the present fiber glass mat having a nominal basis weight of 130 (range 123-137) and nominal caliper of 0.100 (range 0.090-0.100) with a weight reduction calculated to be about 84%. It is believed that similar substitutions can be made on pipes or conduits, laminated Y-pipes or joints, catalytic converters, and other exhaust system components.

Modifications may be made in the specific structure that has been described and illustrated without departing from the spirit and scope of the invention.

I claim:

1. An insulated exhaust system component for a combustion engine exhaust system comprising a metal body having an exterior surface and a path through it for the flow of exhaust gas, a layer of insulating material in contact with the exterior surface, and a layer of metal in contact with the insulating material to hold it in contact with said exterior surface, said insulating material being a flexible wet-laid mat characterized by the absence of asbestos and consisting of about 95-98% by weight of grade D-E interwoven glass fibers having a diameter of about 5.08-7.62 microns and a fiber length of about ¼ to ½ inch with at least 80% of the fibers being at least ¼ inch long and a polyvinyl alcohol resin binder dispersed substantially uniformly throughout the mat and comprising about 2-5% of the weight of the mat, said mat having a basis weight in the range of about 65-150 pounds per 3000 square feet and a caliper in the range of about 0.020 to 0.100 inches, the mat having a tensile strength of at least about 2.5 pounds per inch of width.

2. A component as set forth in claim 1 wherein one side of said mat is flat and the other side is of irregular undulating contour, the flat side of the mat being in contact with the metal layer and the undulating contour being in contact with said exterior surface.

3. The method of insulating an internal combustion engine exhaust muffler or the like having a metal body which comprises selecting an insulating mat characterized by the absence of asbestos and consisting of about 95-98% by weight of grade D-E interwoven glass fibers having a diameter of about 5.08-7.62 microns and a fiber length of about ¼ to ½ inch with at least 80% of the fibers being at least ¼ inch long and a polyvinyl alcohol resin binder dispersed substantially uniformly throughout the mat and comprising about 2-5% of the weight of the mat, said mat having a basis weight in the range of about 65-100 and a caliper in the range of about 0.020 to 0.100 inches, the mat being flexible and having a tensile strength of at least about 2.5 pounds per inch, placing said mat against the outside of the body, placing a layer of metal against the mat to hold it against the body, and securing the metal layer on the body.

4. The method of insulating an internal combustion engine exhaust muffler or the like having a metal body which comprises selecting an insulating mat characterized by the absence of asbestos and consisting of about 95-98% by weight of grade D-E interwoven glass fibers having a diameter of about 5.08-7.62 microns and a fiber length of about ¼ to ½ inch with at least 80% of the fibers being at least ¼ inch long and a polyvinyl alcohol resin binder dispersed substantially uniformly throughout the mat and comprising substantially all the remaining weight of the mat, said mat having a basis weight in the range of about 65-100 caliper in the range of about 0.020 inch to about 0.100 inch, the mat being flexible, resilient and compressible and having a tensile strength of at least 2.5 pounds per inch, one surface of said mat being substantially flat and the other being of a randomly oriented undulating contour, placing the flat surface of said mat against the flat surface of a layer of metal, wrapping the combined layer of metal and mat around the body so that the undulating contour is in contact with the body, and securing the metal layer and mat on the body so that the mat is compressed between the metal layer and metal body.

5. In an insulated system component for the exhaust system of a combustion engine, said component comprising a metal body having an imperforate exterior surface and a path through it for the flow of exhaust gas through the body, a layer of insulating material in contact with the exterior surface, and a layer of metal in contact with the insulating material to hold it in contact with said exterior surface, the improvement comprising said insulating material being a thin wet-laid flexible mat characterized by the absence of asbestos and consisting essentially of about 95-98% by weight of interwoven glass fibers and the balance substantially all a polyvinyl alcohol resin binder dispersed substantially uniformly throughout the mat, said fibers being grade D-E having a diameter of about 5.08-7.62 microns and a fiber length of about ¼ inch to about ½ inch with at least 80% of the fibers being at least ¼ inch long, said mat having a basis weight in the range of about 65 pounds to about 150 pounds per 3000 square feet, the mat having a tensile strength exceeding about 2.5 pounds per inch and being resilient and compressible and being compressed in thickness by said metal layer against said exterior surface, one surface of said mat being substantially flat and the other being of an undulating contour and said flat surface being in contact with said metal layer and said contoured surface being compressed against said exterior surface.

6. A component as set forth in claim 5 wherein said mat and said layer extend completely around the circumference of said body.

* * * * *